United States Patent [19]

Raush et al.

[11] Patent Number: 4,586,644

[45] Date of Patent: May 6, 1986

[54] DEVICE FOR SHEARING ALIGNING AND WELDING METAL SHEETS

[75] Inventors: Russell G. Raush, Conestoga; Raymond A. Alleman, Lancaster; Victor B. Hensel, Lititz, all of Pa.

[73] Assignee: RCA Corporation, Princeton, N.J.

[21] Appl. No.: 643,417

[22] Filed: Aug. 23, 1984

[51] Int. Cl.[4] ............................................. B23K 1/20
[52] U.S. Cl. ................................... 228/5.1; 228/5.7; 228/49.1; 271/268
[58] Field of Search .................... 228/5.7, 5.1, 44, 47, 228/49.1; 156/511; 198/486; 271/268

[56] References Cited

U.S. PATENT DOCUMENTS

| | | | |
|---|---|---|---|
| 3,378,185 | 4/1968 | Wheeler et al. | 228/5.7 |
| 3,394,857 | 7/1968 | Wheeler et al. | 228/5.7 |
| 3,510,045 | 5/1970 | Petros et al. | 228/5.7 |
| 4,042,161 | 8/1977 | Ando | 228/102 |

Primary Examiner—Nicholas P. Godici
Assistant Examiner—Carmine Cuda
Attorney, Agent, or Firm—E. M. Whitacre; D. H. Irlbeck; L. L. Hallacher

[57] ABSTRACT

A device for shearing, welding and aligning two sheets of thin material includes two segmented tables arranged on opposite sides of a vertically moveably welding head. Substantially parallel shears are equally spaced on opposite sides of the welding head. The sheets of material are arranged so that their uneven ends lie between the welding head and the respective shears. Clamping bars are arranged to clamp the sheets of material snugly against moveable segments within each of the segmented tables. The uneven ends are clamped in position and then sheared off. The moveable segments and the clamping bars move the two sheets of material inwardly toward the welding head. The distance that the moveable segments move slightly exceeds the distance between the welding head and respective shears so that the sheared ends overlap a preselected distance. A deflector arranged in the proximity of one of the shears assures that one of the sheets overlaps the other sheet. The vertically moveable welding head is moved downwardly into engagement with the overlapped sheets to effect a strong weld.

10 Claims, 5 Drawing Figures

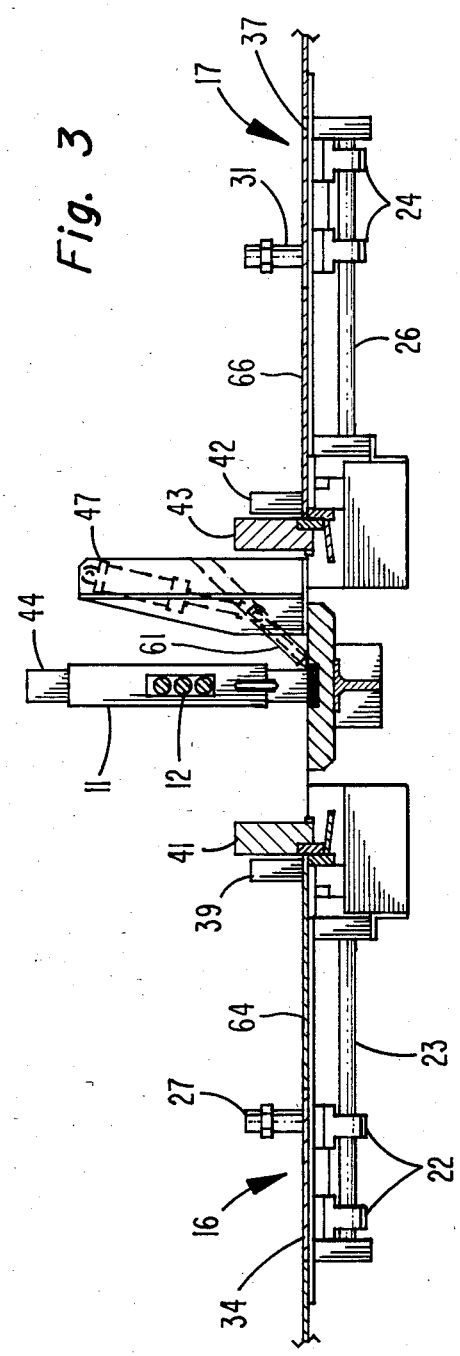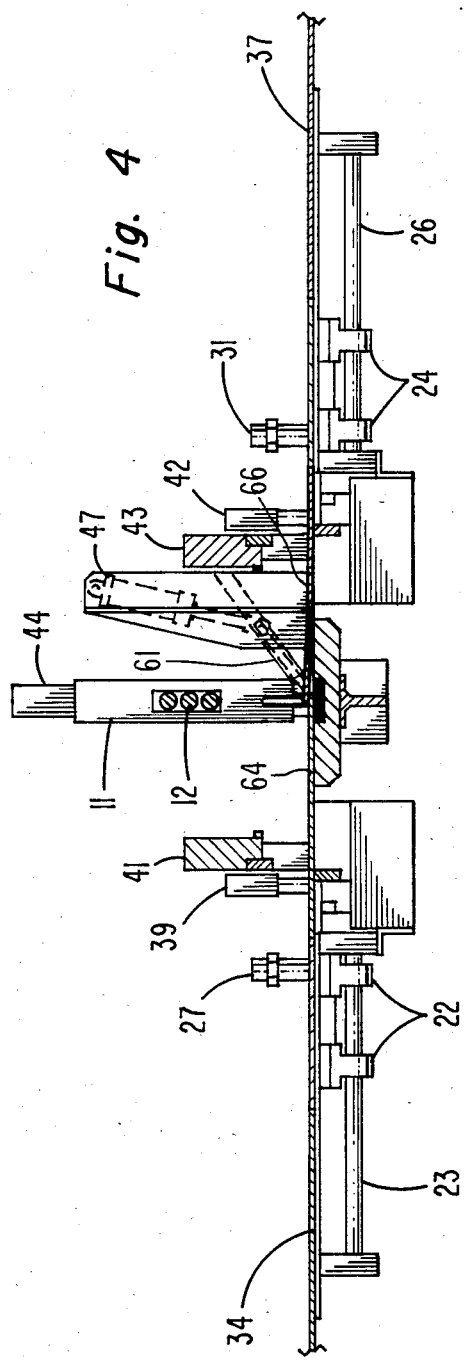

DEVICE FOR SHEARING ALIGNING AND WELDING METAL SHEETS

BACKGROUND OF THE INVENTION

This invention relates generally to welding apparatus and particularly to a device for accurately shearing, aligning and welding together two sheets of metal, such as CRT shadow mask material.

Many types of thin metal parts are produced by acid etching the thin metal from which the parts are made. For example, shadow masks for use in the picture tubes of color television receivers are made by such an acid etching process. During the production of such shadow masks, the thin metal from which the shadow masks are produced is coated with a photosensitive material. The aperture pattern which is to be etched into the material is then photographically produced on both sides of the coated metal. The unexposed photoresist material is then washed away leaving bare metal at the places where the apertures and peripheries of the shadow masks are to be etched. The material is then passed through an acid etching process in which the bare metal is etched away to produce the aperture pattern and the partially etched periphery of the shadow mask.

During the process of applying the photoresistive material to both sides of the bare metal, the metal is pulled by a series of rollers through tanks where the photoresist material is applied. When a roll of material is depleated, and it is necessary to start another roll through the system, the beginning of the new roll is welded to the tail end of the old roll to avoid the necessity of threading the new roll through the roller system. Problems frequently arise because the welding requires the two sheets to overlap in order to provide an area for the welding. The ends of the rolls usually are not cut square and, therefore, a rather large overlap is needed to ensure that the sheets overlap for their full width. When the photoresist material is applied to both sides of the sheets in the vicinity of the weld, the material enters the space between the sheets. Subsequently, as the welded overlap passes over the rollers, the material between the sheets is squeezed out onto the rollers. The excess material clings to the rollers and causes a nonuniform distribution of the photoresist material on subsequent parts of the sheet. This excess material renders impossible the accurate etching of the metal sheet.

For this reason, there is a need for a device for accurately shearing the ends of the sheets for aligning two sheets and for minimizing the overlap where the welding of the two sheets takes place. The instant invention fulfills this long felt need.

BRIEF DESCRIPTION OF THE DRAWINGS

FIG. 3 is a front view showing sheets of material and holding members in a shearing position.

FIG. 4 is similar to FIG. 3 and shows the sheets and holding means in a welding position.

DETAILED DESCRIPTION

Figure 1:
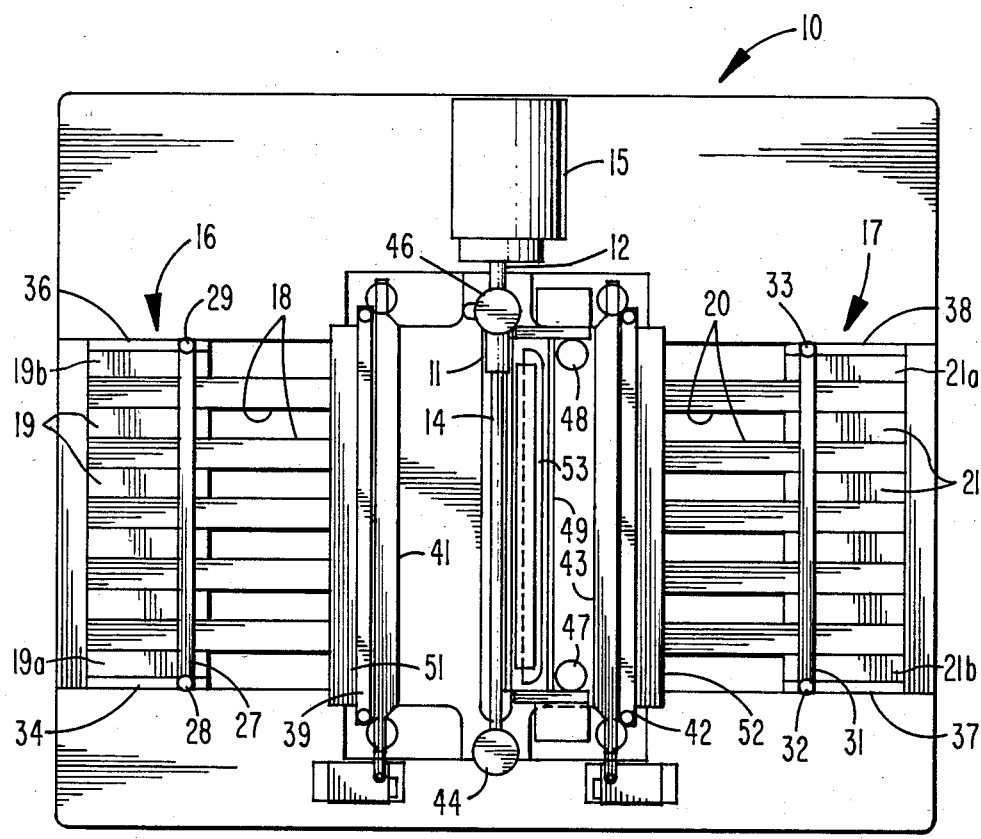
FIG. 1 is a top view of a preferred embodiment.
Figure 2:
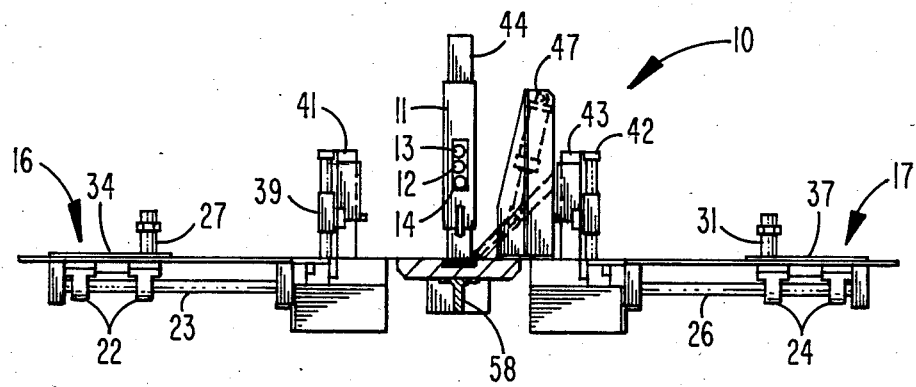
FIG. 2 is a front view of the preferred embodiment of FIG. 1.

In FIGS. 1 and 2, the device 10 for shearing aligning and welding includes a welding head 11. The welding head 11 is arranged to move along a lead screw 12 and is held in a stable vertical position by two guide rods 13 and 14. The lead screw 12 is coupled to a motor 15 which rotates the lead screw and causes the welding head 11 to move linearly along the lead screw. Arranged on opposite sides of the welding head 11 and preferably equally spaced therefrom are two segmented tables 16 and 17. The segmented table 16 is composed of a plurality of fixed segments 18 and a plurality of moveable segments 19 arranged between the fixed segments. Similarly, the segmented table 17 includes a plurality of fixed segments 20 and a plurality of moveable segments 21 arranged between the fixed segments. In FIG. 2, the moveable segments 19 are all coupled to slide bearings 22 which are arranged to slide along a slide rod 23. The slide bearings 22 and the slide rod 23 are arranged beneath one of the outer moveable segments 19a. A similar pair of slide bearings and a slide rod (not shown) are arranged along the other outer moveable segment 19b. Accordingly, the moveable segments are coupled to move in unison toward the welding head 11. Similarly, the moveable segments 21 of the segmented table 17 are fixed to slide bearings 24 to move along a slide rod 26. The slide rod 26 is also arranged beneath the outer moveable segment 21a and a similar slide rod is arranged beneath the outer moveable segment 21b. The moveable segments 19 and 21, therefore, move bilaterally in a direction substantially normal to the lead screw 12. The upper surfaces of the moveable segments 19 and 21 lie in a common plane which is parallel to the lead screw 12. The fixed segments 18 and 20 are arranged with their upper surfaces in a plane parallel to the lead screw 12. The plane of the fixed segments 18 and 20 is slightly beneath, such as 0.005 inch the plane of the moveable segments 19 and 21.

A vertically moveable clamping bar 27 spans the segmented table 16. The clamping bar 27 is vertically moveable on two vertical shafts 28 and 29. A similar clamping bar 31 spans the segmented table 17 and is vertically moveable on vertical shafts 32 and 33. Guide bars 34 and 36 are arranged parallel to the outer moveable segments 19a and 19b of the segmented table 16. Similarly, guide bars 37 and 38 are arranged parallel to the outer moveable segments 21a and 21b of the segmented table 17. An additional clamping bar 39 is arranged parallel to the lead screw 12. A shear blade 41 is parallel to the lead screw 12 in the close proximity of the clamping bar 39. Similarly, an additional clamping bar 42 and a shear blade 43 are arranged on the other side of the lead screw 12. The shear blades 41 and 43 are arranged at substantially equal distances from the line of weld. The moveable segments 19 and 21 and the slide rods 23 and 26 are dimensioned so that the moveable segments 19 and 21 move a distance which slightly exceeds the spacing of the shear blades 41 and 43 from the line of weld.

The welding head 11, the lead screw 12 and the guide rods 13 and 14 are supported at both ends by two shafts 44 and 46 so that the entire welding assembly is vertically moveable. The support structure and the moving mechanism which can be a cylinder, are within the purview of one skilled in the art and are not shown for simplicity of illustration. Cylinders 47 and 48 are arranged in the proximity of the ends of the shear blade 43. The cylinders 47 and 48 support a press bar 49 which spans the segmented table 17. The press bar 49 is used to press and hold the overlapped sheets of material together to assure a better weld, as shown in detail in FIG. 5.

Figure 5:
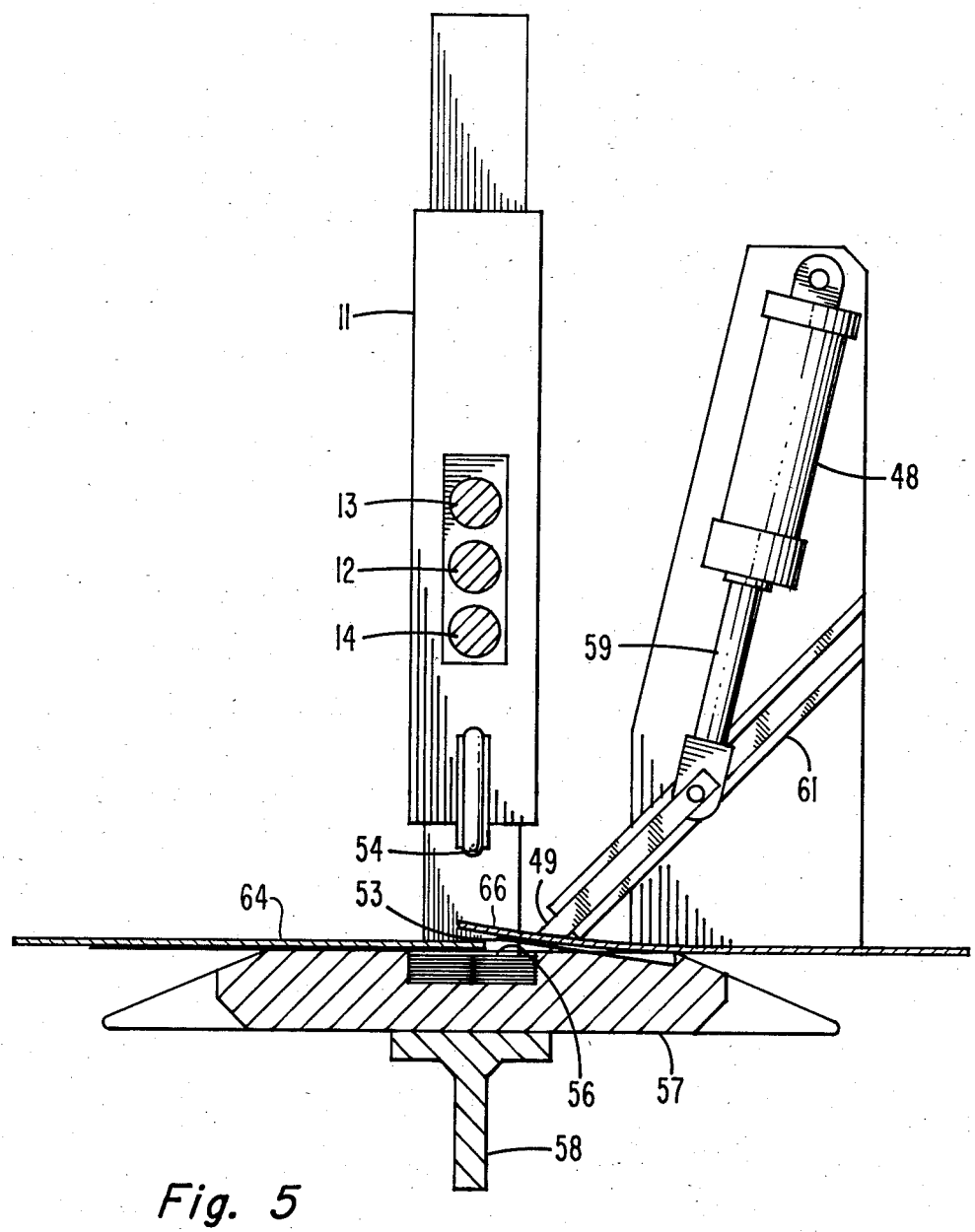
FIG. 5 is an enlarged view of the welding head and the holding means in a nonwelding position.

The operation of the device is described with reference to FIGS. 1, 3 and 4. The end 64 of a depleted roll of material is arranged to be between the shear blade 41 and the line of weld to assure that the full width sheet is sheared. The longitudinal axis of the depleted sheet of material is held substantially perpendicular to the lead screw 12 by the guide bars 34 and 36. Typically, the cut end of the depleted sheet of material is skewed and not square with respect to the longitudinal axis of the material. The clamping bar 27 is actuated to move downwardly and clamp the sheet of material against the moveable segments 19. The upper surface of the clamping surface 51 is arranged in the same plane as the upper surfaces of the moveable segments 19. The shear blade 41 is actuated to shear off the skewed end of the material. The actuation of the shear 41 also actuates the clamping bar 39 to clamp the sheet against the clamping surface 51 immediately before the shear engages the sheet. After the sheet is sheared, the shear and the clamping bar 39 are raised. The end 66 of the new sheet of material is guided into a position between the shear blade 43 and the line of weld by the guide bars 37 and 38 to assure that the full width of sheet is sheared. The clamping bar 31 is actuated to clamp the sheet against the upper surface of the moveable segments 21. The clamping surface 52 is arranged in the same plane as the upper surfaces of the moveable segments 21. The shear blade 43 is actuated to shear the end of the incoming piece of material and the sheared end is substantially perpendicular to the longitudinal axis of the sheet. The clamping bar 42 clamps the sheet against the clamping surface 52 before the shear blade 43 engages the sheet. The shear blade 43 and the clamping bar 42 are raised immediately after the sheet is sheared. The moveable segments 19 are then caused to slide along the guide rod 23 toward the line of weld as the clamping bar 27 holds the sheet against the upper surfaces of the moveable segments 19. The upper surfaces of the moveable segments 19 are slightly above the upper surfaces of the fixed segments 18 and therefore the sheet of material easily slides while the fixed segments 18 give vertical support to the material to minimize undulations in the material. Similarly, the new sheet of material is moved toward the line of weld as the slide bearings 24 slide along the slide rod 26. The travel distance of the slide bearings 22 and 24 along the slide rods 23 and 26 is selected to be slightly greater than the spacing of the shear blades 41 and 43 from the line of weld, for example 0.125 inch. The two sheets of material therefore overlap directly beneath the welding head 11, as shown in FIGS. 4 and 5. The cylinders 47 and 48 are actuated to move the press bar 49 downwardly to press the overlapped sheets into firm engagement. As best shown in FIGS. 1 and 5, a deflector 53 extends substantially the full width of the segmented table 17. The deflector 53 raises the incoming sheet above the other sheet and assures that the two sheets overlap.

In FIG. 5 The welding head 11 includes a rotatably mounted disc-shaped welding electrode 54. A fixed welding electrode 56 is arranged beneath the rotatable electrode 54. The fixed electrode 56 is supported by appropriate support members 57 and 58. After the overlapped sheets of material are firmly clamped by the press bar 49, the welding electrode 54 is lowered to be in contact with the overlapped sheets. The motor 16 is then actuated to rotate the lead screw 12 and cause the disc-shaped welding electrode to roll along the overlapped sheets. The weld is thus effected as the welding electrode 54 moves along the overlapped sheets. When the full width of the sheets is traveled, the welding electrode 54 is raised and clamping mechanisms 27, 31 and 47 are released to allow the welded together sheets of material to be pulled through the processing line.

In FIG. 5, the cylinder 48 includes a shaft 59 which is pivotably coupled to the clamping bar 49. The end of the clamping bar is arranged to slide in a U-shaped guide member 61. A similar U-shaped guide 62 (FIG. 4) is arranged in the proximity of the cylinder 47 and guides the other end of the press bar 49. The cylinders 47 and 48 are simultaneously actuated to cause the press bar 49 to slide in the guide members 61 and 62 to press against the end 66 of the incoming sheet and depress the ramp 53 whereby the overlapped ends of the sheets tightly engage to permit a strong weld.

What is claimed is:

1. A device for shearing, welding and aligning two sheets of metal comprising:
    first and second shear means spaced a preselected distance apart and arranged to individually shear said sheets to be substantially square;
    first movable holding means for receiving one of said sheets, second moveable holding means for receiving the other of said sheets, said first and second holding means being arranged to hold said sheets at shear positions in the proximity of said first and second shear means respectively, said first and second holding means being moveable in opposite directions to move said sheets from said shear positions to a line of weld between said shear means whereby said sheets overlap, said first and second moveable holding means each including a segmented table, some of the segments being fixed and the other segments being moveable, said moveable segments and said fixed segments being elongated in a direction substantially parallel to the direction of travel of said moveable segments, and wherein said first and second holding means includes a clamping bar spanning said segmented table whereby said bars clamp said sheet against said moveable segments during movement to said weld position; and
    welding means arranged at said line of weld for welding said sheets along said overlap.

2. The device of claim 1 wherein said moveable segments are arranged between said fixed segments and said moveable segments are shorter than said fixed segments.

3. The device of claim 2 wherein said moveable segments are closer to said clamping bars than said fixed segments whereby said sheets are clamped to said moveable segments and slide along said fixed segments.

4. The device of claim 3 wherein said clamping bars are equally spaced from said line of weld.

5. The device of claim 4 further including sheet deflector means in the proximity of one of said shear means, said deflector means raising one of sheets to ensure that said sheets overlap.

6. The device of claim 5 further including means for pressing against at least one of said sheets in the proximity of said overlap to assure contact between said sheets.

7. The device of claim 6 wherein said welder includes a disc-shaped electrode and said electrode rolls along said overlap.

8. The device of claim 7 wherein said welder is moveable toward and away from said overlap.

9. The device of claim 4 further including additional clamping bars in the proximity of said shear positions to further hold said sheets in said shear positions.

10. The device of claim 7 further including additional clamping bars in the proximity of said shear positions to further hold said sheets in said shear positions.

* * * * *